United States Patent [19]
Wyard et al.

[11] Patent Number: 6,167,398
[45] Date of Patent: Dec. 26, 2000

[54] INFORMATION RETRIEVAL SYSTEM AND METHOD THAT GENERATES WEIGHTED COMPARISON RESULTS TO ANALYZE THE DEGREE OF DISSIMILARITY BETWEEN A REFERENCE CORPUS AND A CANDIDATE DOCUMENT

[75] Inventors: Peter J Wyard, Woodbridge; Tony G Rose, Guildford, both of United Kingdom

[73] Assignee: British Telecommunications public limited company, London, United Kingdom

[21] Appl. No.: 09/068,452

[22] PCT Filed: Jan. 30, 1998

[86] PCT No.: PCT/GB98/00294

§ 371 Date: May 13, 1998

§ 102(e) Date: May 13, 1998

[87] PCT Pub. No.: WO98/34180

PCT Pub. Date: Aug. 6, 1998

[30] Foreign Application Priority Data

Jan. 30, 1997 [GB] United Kingdom .................. 9701866

[51] Int. Cl.[7] .............................................. G06F 17/30
[52] U.S. Cl. ...................... 707/5; 707/2; 707/3; 707/4
[58] Field of Search ................................. 707/5, 10, 2, 3, 707/4

[56] References Cited

U.S. PATENT DOCUMENTS

| | | | |
|---|---|---|---|
| 5,625,767 | 4/1997 | Bartell et al. | 345/440 |
| 5,724,571 | 3/1998 | Woods | 707/5 |
| 5,873,076 | 2/1999 | Barr et al. | 707/3 |
| 5,907,839 | 5/1999 | Roth | 707/5 |
| 5,937,422 | 8/1999 | Nelson et al. | 707/531 |

FOREIGN PATENT DOCUMENTS

| | | |
|---|---|---|
| 0687987 A1 | 12/1995 | European Pat. Off. . |
| WO 92/04681 | 3/1992 | WIPO . |
| WO 96/32686 | 10/1996 | WIPO . |

OTHER PUBLICATIONS

W. Bruce Croft, Intelligent Internet Services Effective Text Retrieval Based on Combining Evidence from the Corpus and Users, vol. 10 issue 6 IEEE electronic library online, pp.59–63, Dec. 1995.

Besancon et al., Textual Similarities Based on a Distributional Approach, IEEE electronic library online, p. 180–184, Sep. 1999.

Chapter 4 of the book "Introduction to Modern Information Retrieval" by G. Salton, published by McGraw Hill, 1983.

Dunning, "Accurate Methods for the Statistics of Surprise and Coincidence", Computational Linguistics, vol. 19, No. 1, 1993.

Katz, "Estimation of Probabilities from Sparse Data", IEEE Transactions on Acoustics, Speech and Signal Processing, vol. ASSP–35, 1987.

(List continued on next page.)

*Primary Examiner*—John Breene
*Assistant Examiner*—Greta L. Robinson
*Attorney, Agent, or Firm*—Nixon & Vanderhye P.C.

[57] ABSTRACT

An internet information agent accepts a reference document, performs an analysis upon it in accordance with metrics defined by its analysis algorithm and obtains respective lists (word, character-level n-gram, word-level n-gram), derives weights corresponding to the metrics, applies the metrics to a candidate document and obtains respective returned values, applies the weights to the returned values and sums the results to obtain a Document Dissimilarity (DD) value. This DD is compared with a Dissimilarity Threshold (DT) and the candidate document is stored if the DD is less than the DT. A user can apply relevance values to the search results and the agent modifies the weights accordingly. The agent can be used to improve a language model for use in speech recognition applications and the like.

18 Claims, 4 Drawing Sheets

OTHER PUBLICATIONS

Jelinek, "Self–Organised Language Modelling for Speech Recognition", Readings in Speech Recognition, edited by A. Waibel and K. Lee, published by Morgan Kaufmann, 1990.

Pearce et al, Generating a Dynamic Hypertext Environment with n–gram Analysis, Proceedings of the International Conference on Information and Knowledge Management CIKM, Nov. 1, 1993, pp. 148–153, XP000577412.

Wong et al, "Implementations of Partial Document Ranking Using Inverted Files", Information Processing & Management (Incorporating Information Technology), vol. 29, No. 5, Sep. 1993, pp. 647–669, XP002035616.

INFORMATION RETRIEVAL SYSTEM AND METHOD THAT GENERATES WEIGHTED COMPARISON RESULTS TO ANALYZE THE DEGREE OF DISSIMILARITY BETWEEN A REFERENCE CORPUS AND A CANDIDATE DOCUMENT

BACKGROUND OF THE INVENTION

1. Field of the Invention

The present invention relates to information retrieval, and particularly, but not exclusively, to an Internet information agent which analyses candidate documents for dissimilarity with a reference corpus identified by a user of the agent.

2. Related Art

In the art of information retrieval it is known for a user to specify the initial conditions for retrieval by means of a set of keywords. Various search engines are known which have search languages adapted for advanced searching using Boolean operators for combining keywords.

SUMMARY OF THE INVENTION

According to a first aspect of the present invention there is provided a method of information retrieval comprising the steps of:

analysing the content of at least part of a reference corpus in accordance with a first predetermined function and producing a first output, retrieving a candidate document in text form, providing the first output as an input to a second predetermined function, analysing at least part of the retrieved text in accordance with the second predetermined function and producing a second output, the second output being referred to as a dissimilarity measure and being indicative of the degree of dissimilarity between the analysed part of the reference corpus and the analysed part of the retrieved text, and storing said retrieved text if the second output is indicative of a degree of dissimilarity less than a predetermined degree of dissimilarity.

It will be appreciated that the larger the value of the dissimilarity measure the greater the degree of dissimilarity between the analysed part of the reference corpus and the analysed part of the retrieved text, and, conversely, the smaller the value of the dissimilarity measure the lesser the degree of dissimilarity between the analysed part of the reference corpus and the analysed part of the retrieved text. In other words, the dissimilarity measure will have a zero value if the two documents are identical.

The present invention differs from the above prior art retrieval techniques in that the user provides a reference corpus (a start document) as an example of the type of document that the user would like to find, and the method of the invention, as performed by an information retrieval agent, analyses the reference corpus in accordance with one or more of a range of metrics, these relating to word (term) frequency of the title of the candidate document, character-level n-gram frequency, word frequency of the whole text of the candidate document, and word-level n-gram language model. The greater the combination of the metrics, the better does the agent perform.

A method of the present invention can be used for information retrieval on demand by a user, or may be used to improve a language model used in a speech application, for example a speech recognition application.

Preferably, the analysed part of said retrieved text is the title of the candidate document.

Preferably, the first predetermined function comprises the steps of:

producing a first term frequency list, TFL, from said at least part of the reference corpus, obtaining respective inverse document frequencies, IDF, for the terms of the first TFL, and producing, for the first TFL, a first corresponding vector comprising respective elements, each of which elements is the term frequency, TF, of a respective term of the first TFL multiplied by its corresponding IDF, TFIDF, said first corresponding vector constituting said first output; and wherein the second predetermined function comprises the steps of:

producing a second TFL from at least part of the retrieved text, producing, for the second TFL, a second corresponding vector comprising respective elements, each of which elements is the TF of a respective term of the second TFL, and deriving a measure of the difference between said first vector and said second vector, said difference measure constituting a said dissimilarity measure.

Alternatively, or additionally, the first predetermined function comprises generating a first character-level n-gram frequency list having n-grams from bigrams up to m-grams, where m is a predetermined integer, said first character-level n-gram frequency list constituting said first output, or as the case may be, a component of said first output;

the second predetermined function comprises generating a second character-level n-gram frequency list having n-grams from bigrams up to m-grams, and performing rank-based correlation process between said first and said second character-level n-gram frequency lists and obtaining a correlation result, the correlation result constituting said dissimilarity measure, or, as the case may be, a respective component of said dissimilarity measure and, in this latter case, the difference measure of said vectors constitutes another respective component of said dissimilarity measure.

Alternatively, the first predetermined function comprises generating a first character-level n-gram frequency list having n-grams from bigrams up to m-grams, where m is a predetermined integer, said first character-level n-gram frequency list constituting said first output, or as the case may be, a component of said first output;

the second predetermined function comprises generating a second character-level n-gram frequency list having n-grams from bigrams up to m-grams, and obtaining a Log-Likelihood measure of the dissimilarity between said first and second character-level n-gram frequency lists, the Log-Likelihood measure constituting said dissimilarity measure, or, as the case may be, a respective component of said dissimilarity measure and, in this latter case, the difference measure of said vectors constitutes another respective component of said dissimilarity measure.

Alternatively, or additionally, the first predetermined function comprises generating a first word frequency list, said first word frequency list constituting said first output, or as the case may be, a component of said first output;

the second predetermined function comprises generating a second word frequency list, and performing rank-based correlation process between said first and said second word frequency lists and obtaining a correlation result, the correlation result constituting said dissimilarity measure, or, as the case may be, a respective component of said dissimilarity measure and, in this latter case, the difference measure of said vectors constitutes another respective component of said dissimilarity measure.

Alternatively, the first predetermined function comprises generating a first word frequency list, said first word frequency list constituting said first output, or as the case may be, a component of said first output;

the second predetermined function comprises generating a second word frequency list, and obtaining a Log-Likelihood measure of the dissimilarity between said first and second word frequency lists, the Log-Likelihood measure constituting said dissimilarity measure, or, as the case may be, a respective component of said dissimilarity measure and, in this latter case, the difference measure of said vectors constitutes another respective component of said dissimilarity measure.

Alternatively, or additionally, the first predetermined function comprises generating a first word-level n-gram frequency list having n-grams from bigrams up to m-grams, where m is a predetermined integer, said first word-level n-gram frequency list constituting a said first output, or as the case may be, a component of said first output; and the second predetermined function comprises generating a second word-level n-gram frequency list having n-grams from bigrams up to m-grams, and performing rank-based correlation process between said first and second word-level n-gram frequency lists and obtaining a correlation result, the correlation result constituting a said dissimilarity measure or, as the case may be, a respective component of said dissimilarity measure, and wherein, as appropriate, the difference measure of said vectors constitutes another respective component of said dissimilarity measure.

Alternatively, the first predetermined function comprises generating a word-level n-gram frequency list having n-grams from bigrams up to m-grams, where m is a predetermined integer, and deriving from said word-level n-gram frequency list a first back-off n-gram language model, the language model constituting a said output;

the second predetermined function comprises applying said language model to the retrieved text and obtaining a perplexity value, the perplexity value constituting a said dissimilarity measure or, as the case may be, a respective component of said dissimilarity measure, and wherein, as appropriate, the difference measure of said vectors constitutes another respective component of said dissimilarity measure.

Preferably, when said dissimilarity measure comprises at least two said respective components, there is included the step of applying respective weights ($W_i$) to said respective components.

Preferably, the first predetermined function comprises the steps of performing an initial evaluation of at least part of the reference corpus, and setting initial values for said respective weights in dependence upon the result of said initial evaluation.

More preferably, the step of setting initial values for said respective weights comprises (a) the substep of dividing said reference corpus into a training portion, the training portion constituting said at least part of the reference corpus, and a development portion;

(b) the substep of analysing the development portion in accordance with the second predetermined function and producing respective components of a measure of the dissimilarity between the training portion and the development portion; and (c) obtaining said initial values for said respective weights by dividing a predetermined constant by the respective components of said measure of the dissimilarity between the training portion and the development portion.

Preferably, there are included the steps of forming a further reference corpus by combining the training portion with a stored retrieved text whose dissimilarity measure is least, obtaining from said further reference corpus a corresponding word-level n-gram frequency list, and deriving from said corresponding word-level n-gram frequency list a corresponding second back-off n-gram language model, the second language model constituting a replacement for said first language model.

Preferably, the first predetermined function comprises (a) a prior substep of applying said first language model to said development portion and obtaining a first perplexity value ($PP_1$), (b) a substep of applying said second language model to said development portion and obtaining a second perplexity value (PP2), (c) a substep of modifying said weights by deriving, for each weight ($W_i$), a respective weight factor ($1+k_i$), where $k_i$ is a function of the contribution that the respective weighted dissimilarity component makes to the dissimilarity measure, and of the value of $PP_1-PP_2$, and (d) the substep of multiplying each weight by its respective weight factor ($1+k_i$).

Preferably, said step of performing an initial evaluation of at least part of the reference corpus includes obtaining a word count (WC) of said at least part of the reference corpus.

The step of performing an initial evaluation may include obtaining a measure of the homogeneity (H) of said at least part of the reference corpus.

Preferably, said homogeneity measure is obtained by dividing said at least part of the reference corpus into a plurality of parts, obtaining respective word frequency lists for said plurality of parts, and performing rank-based correlation process between at least one pair of said word frequency lists of said initial evaluation, the result of the correlation constituting said homogeneity measure.

Alternatively, said homogeneity measure is obtained by dividing said at least part of the reference corpus into a plurality of parts, obtaining respective word frequency lists for said plurality of parts, obtaining a Log-Likelihood measure of the dissimilarity between at least one pair of said word frequency lists of said initial evaluation, the resulting Log-Likelihood measure constituting said homogeneity measure.

When each of said first and said second predetermined functions comprises generating a respective word-level n-gram frequency list, and when said dissimilarity measure comprises at least two said respective components; then preferably said step of setting initial values for the weights comprises substeps of calculating a confidence value (CV), where CV=WC/H, and, if CV is less than a predetermined threshold, setting to substantially zero the value of the weight corresponding to the respective dissimilarity component associated with said word-level n-gram frequency lists.

There may be included the steps of presenting to a user, for each of a plurality of stored retrieved texts, the respective dissimilarity values and respective links to said plurality of stored retrieved texts, receiving from the user an allocated relevance value in respect of a presented similarity value, and modifying said weights in accordance with a predetermined function of said allocated relevance value.

Preferably, the presenting step includes presenting respective document titles in association with the presented dissimilarity values.

The user may allocate respective relevance values in respect of a plurality of said presented dissimilarity values, and the modifying step may comprise iteratively modifying said weights for each of said respective relevance values.

Preferably, the modifying step performs a first modification of said weights in accordance with said predetermined function of the relevance value corresponding to the stored retrieved text having the lowest value dissimilarity measure.

The step of modifying said weights may comprise the substep of deriving, for each weight ($W_i$), a respective weight factor ($1+k_i$), where $k_i$ is a function of the contribution that the respective weighted dissimilarity component makes to the dissimilarity measure, and of the value of $R-R_{mean}$, where $R_{mean}$ is the mean of the lowest and highest possible relevance values, and the substep of multiplying each weight by its respective weight factor.

In accordance with a second aspect of the present invention there is provided an information agent for use in a communications network including a plurality of databases, the agent comprising means for analysing the content of at least part of a reference corpus in accordance with a first predetermined function and producing a first output, means for retrieving a candidate document in text form, means for providing the first output as an input to a second predetermined function, means for analysing at least part of the retrieved text in accordance with the second predetermined function and producing a second output, the second output constituting a measure of the dissimilarity between the analysed part of the reference corpus and the analysed part of the retrieved text, and means for storing said retrieved text if the dissimilarity measure is less than a predetermined dissimilarity threshold.

In accordance with a third aspect of the present invention there is provided a method of testing the suitability of a reference document to be at least a part of a reference corpus for use in information retrieval by Query By Example, the method comprising the steps of:

receiving a possible reference document;

analysing the content of the possible reference document by the substeps of dividing the possible reference document into two substantially equal portions, obtaining a measure of linguistic dissimilarity between the two portions, and comparing the obtained measure with a predetermined criterion to obtain an analysis result; and if the analysis result is favourable, deeming the possible reference document to be suitable to be said at least part of the reference corpus.

Preferably, the dividing substep comprises allocating each sentence of the possible reference document to one or other of the portions on a random basis.

Alternatively, or additionally the obtaining substep comprises generating a respective word frequency list for each of the two portions and performing rank-based correlation process between the two word frequency lists.

Preferably, the predetermined criterion is that the result of the correlation is less than a predetermined value.

BRIEF DESCRIPTION OF THE DRAWINGS

An Internet information agent of the present invention and two applications incorporating the agent will now be described by way of example with reference to the drawings in which.

DETAILED DESCRIPTION OF THE EXEMPLARY EMBODIMENTS

The following description assumes that the skilled person in the art is familiar with information technology, the Internet, the interactive manner in which Web pages including buttons and fields are presented to the user on the screen of a computer monitor and the user selects, e.g. a further page or service by clicking on the appropriate button using a mouse, and enters information in fields by means of a keyboard, e.g. the entering of a Universal Resource Locator (URL) in a location field to request display of the page corresponding to the entered URL.

Figure 1:
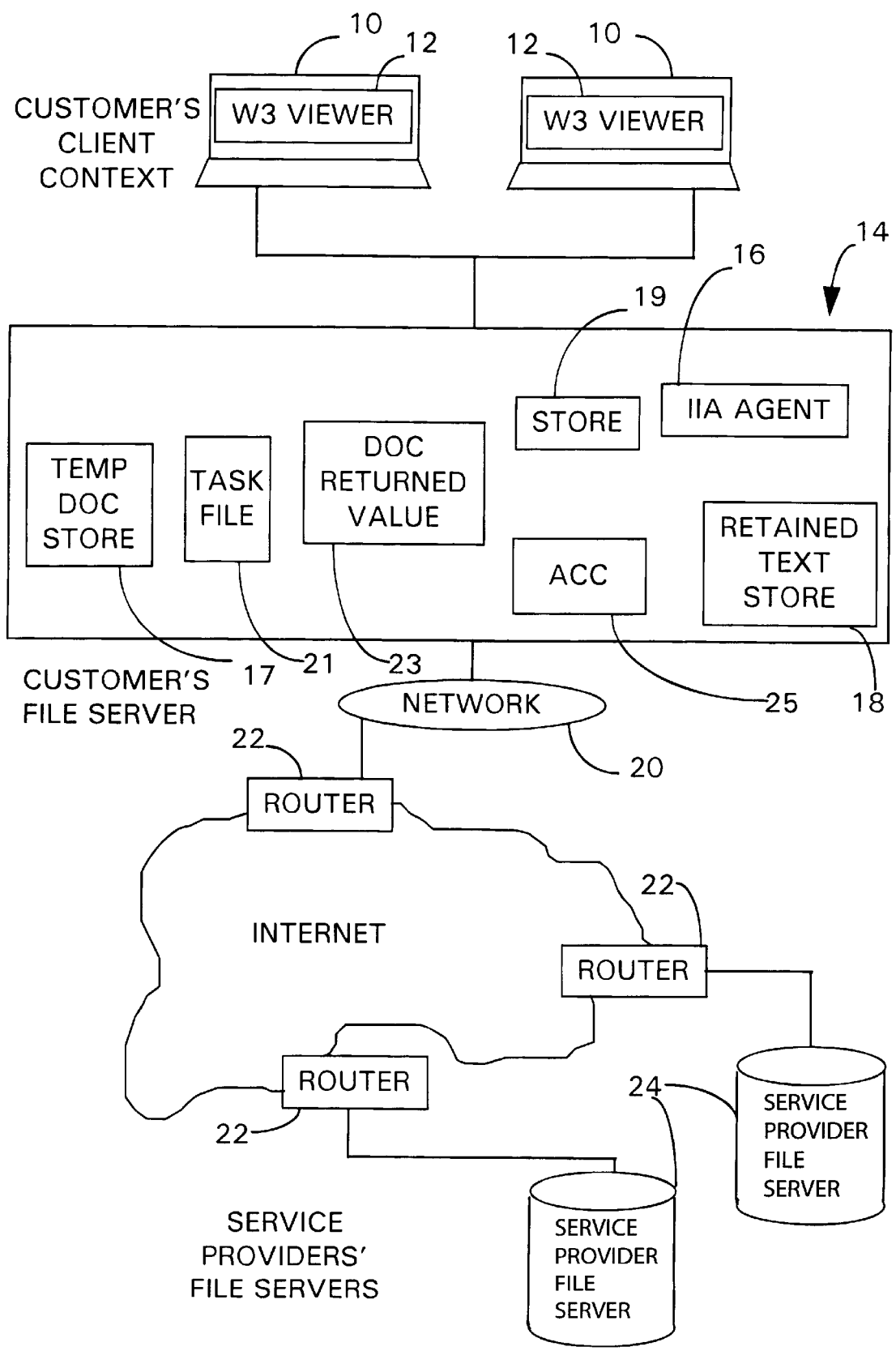
FIG. 1 shows an information access system incorporating an information agent system.

Referring to FIG. 1, an information access system according to an embodiment of the present invention may be built into a known form of information retrieval architecture, such as a client-server type architecture connected to the Internet.

In more detail, a customer, such as an international company, has a customer's client context comprising multiple users equipped with personal computers or workstations 10, each having a resident World Wide Web (WWW or W3) viewer 12 and being connected to a WWW file server 14. An Internet information agent (IIA) 16, effectively an extension of the viewer 12, is resident in the form of a software entity on the WWW file server 14. In a variant, the IIA 16 resident on the file server 14 is replaced by a respective IIA 16 resident on each workstation 10.

The WWW file server 14 is connected to the Internet in known manner, for instance via the customer's own network 20 and a router 22. Service providers' file servers 24 can then be accessed via the Internet, again via routers.

Also resident on, or accessible by, the file server 14 is a retained text store 18, the use of which will be described later.

In an IIA based system, the agent 16 itself can be built as an extension of a known viewer such as Netscape. The agent 16 is effectively integrated with the viewer 12, which might be provided by Netscape or by Mosaic etc, and controls the display of pages and search results (also referred to as search documents).

As described above, in the client-server architecture, the retained text store 18 sits on file in the file server 14 where the agent 16 is resident, but in variants the retained text store 18 can be resident on a remotely accessed server.

An agent 16, being a software agent, can generally be described as a software entity, incorporating functionality for performing a task or tasks on behalf of a user, together with local data, or access to local data, to support that task or tasks. The tasks relevant in an IIA system, one or more of which may be carried out by an agent 16, are described below. The local data will usually include data from the retained text store 18, and the functionality to be provided by an agent 16 will generally include means to apply an analysis algorithm and store the results, and to provide to the user a ranked list of search results.

Embodiments of the present invention might be built according to different software systems. It might be convenient for instance that object-oriented techniques are applied. However, in embodiments as described below, the file server 14 will be Unix based. The system is implemented in "Perl", although the client can be any machine which can support a W3 viewer.

Figure 2:
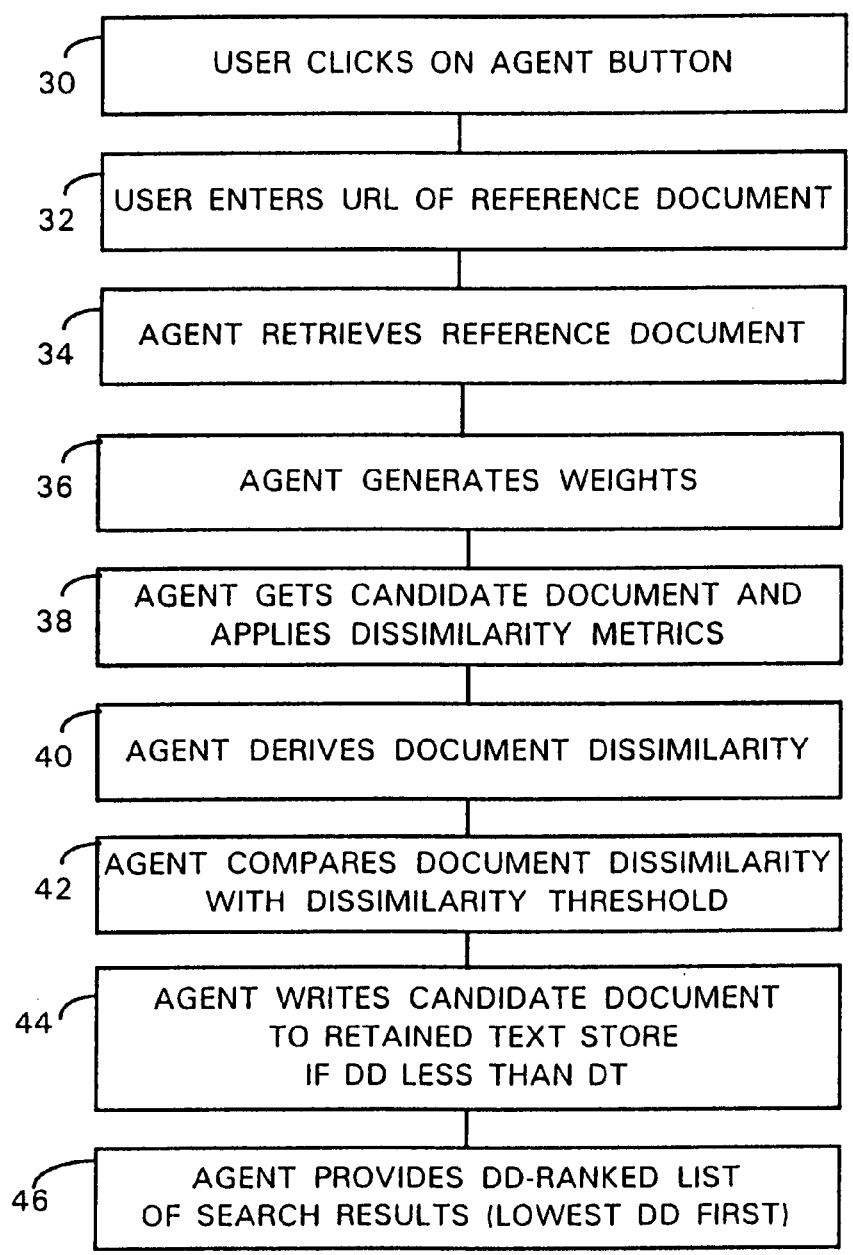
FIG. 2 shows a flow diagram of an information retrieval process of the access system of FIG. 1.
Figure 3:
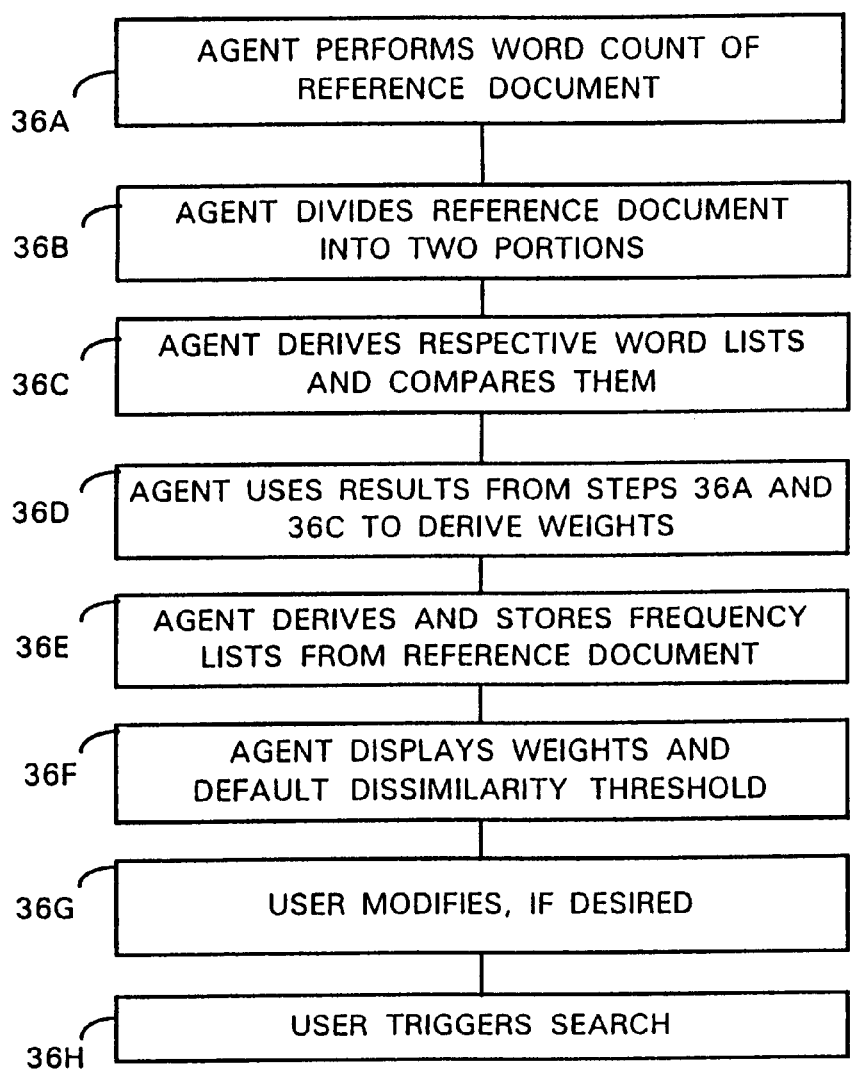
FIG. 3 shows a flow diagram of substeps of one of the steps of the flow diagram of FIG. 2.
Figure 4:
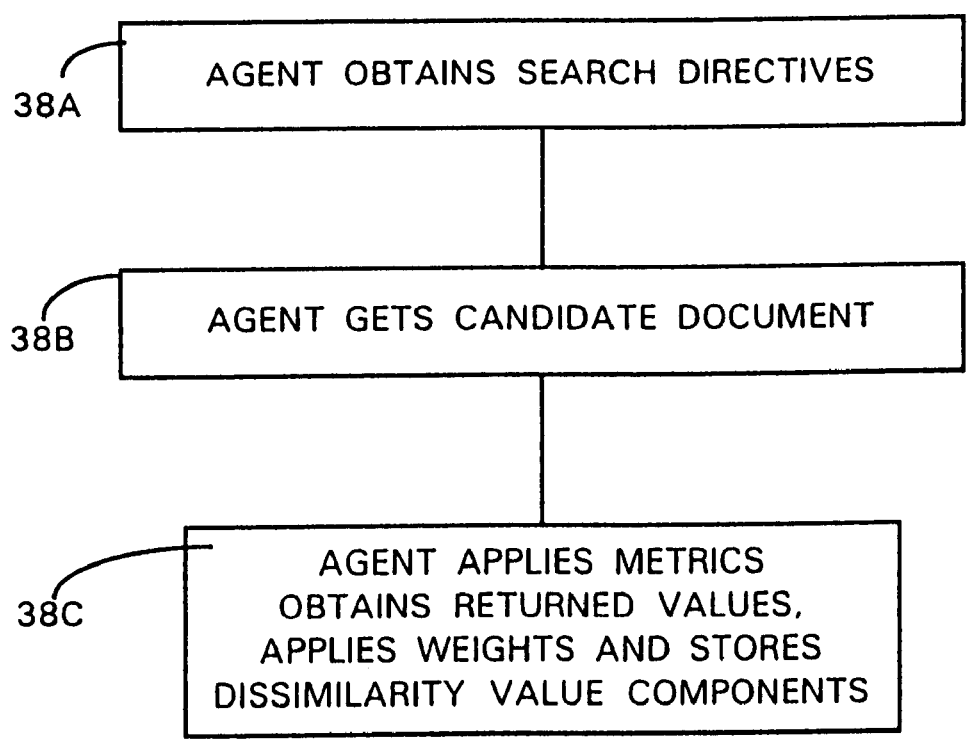
FIG. 4 shows a flow diagram of substeps of another of the steps of the flow diagram of FIG. 2.

With additional reference to the flow diagrams of FIGS. 2 to 4, a first application of the agent 16 performs information retrieval (also known as information access) activation by a user of a search request known in the art as "Query By Example", or "Find me another like this". In this embodiment, the user at a workstation 10 starts information retrieval by clicking on a button which triggers the agent 16 (step 30). A page is now downloaded from the file server 14 to the user's workstation, this page having various fields, including a field for the entry of URLs, and various buttons, including a "Query By Example" button. The user positions the screen cursor in the URL entry field in the usual manner, types the URL of a reference document (step 32), and clicks on the Query by Example button to trigger, i.e. launch, the agent 16, which begins by retrieving the reference document (step 34).

This reference document constitutes the reference corpus for the agent 16 but, as explained below, the reference corpus can be constituted by two or more documents taken collectively.

The operation of the agent 16 will be described briefly first, and in more detail later.

The agent 16, processes the retrieved reference document (step 36) to derive four weights, $W_1$ to $W_4$, which correspond to four dissimilarity metrics, $M_1$ to $M_4$, which dissimilarity metrics will be applied to a candidate document, i.e. a document under evaluation by the agent, to obtain returned values $RV_1$ to $RV_4$.

The agent 16 starts with the candidate document identified by the URL contained in the search directives described below. It applies to the candidate document the four dissimilarity metrics, $M_1$ to $M_4$, obtains the four returned values $RV_1$ to $RV_4$, as described below, derives (step 38) a Document Dissimilarity (DD) in accordance with the expression $$DD = \sum_{i=2}^{4} W_i RV_i + W_1 \cdot (1 - RV_1)$$

and compares the DD with a Dissimilarity Threshold (DT) (step 42) to determine whether that candidate document is to be written to the retained text store 18 (thus eliminating the need for a further download by the user at a later stage) and notified to the user as "another like the reference document", when at the end of the search a list of documents ranked in reverse order of DD, i.e. lowest first, is provided on the user's workstation (step 46). This expression constitutes a ninth part of the analysis algorithm, and will be further referred to later.

The four metrics and the manner in which they operate to obtain the returned values will now be described in more detail, beginning with metric $M_1$.

The returned value RV, obtained by the application of the dissimilarity metric $M_1$ to the candidate document is a measure of the dissimilarity of the words of the title of the candidate document to the content of the reference document in the form of its word frequency list. The agent 16 under control of a first part of its analysis algorithm, which defines the metric $M_1$, generates the word frequency list of the reference document (and in common with other parts of the analysis algorithm excludes frequently-occurring words such as the definite and indefinite articles). The words (also referred to as terms) are ranked in order of their frequency of occurrence, i.e. term frequency, and the list is also known as a term frequency list (TFL).

Under control of this first part of the analysis algorithm, the agent 16 applies the metric $M_1$ to the title of the candidate document and generates a word frequency list. Then, using the two word frequency lists, the agent 16 generates the returned value $RV_1$ in accordance with a version of the cosine measure technique as developed by Salton and described in Chapter 4 of the book "Introduction to Modern Information Retrieval" by G. Salton, published by McGraw Hill, 1983.

In this version of the cosine measure technique, the agent 16 takes the term frequency (TF) of each word of the word frequency list of the reference document, multiplies each TF by the inverse of the number of documents in which the respective word is known to appear (the inverse document frequency or IDF) to produce values known in the art as TFIDFs or TF.IDFs, and from these TFIDFs generates a vector (also known as a vector space model).

To obtain the IDFs, the agent indirectly uses, as described below, a database of English language documents (the CELEX database) published by CELEX, the Dutch Centre for Lexical Information, Max Planck Institute for Psycholinguistics, Nijmegen, Netherlands. The CELEX database (also known as the CELEX corpus) contains some 18 million English words and is available in CD-ROM.

Prior to the agent 16 being available for operational use, a word frequency list will have been produced from this CD-ROM off-line by a process which is not part of the agent 16 and which stored the word frequency list as a file on a disk in the server 14. The agent 16 accesses this file for each word of the word frequency list of the reference document, obtains the respective term frequency, generates the required IDF by obtaining the inverse, i.e. reciprocal, of the natural logarithm of the term frequency, and uses this to produce the TFIDF for the word.

Under control of the first part of the analysis algorithm, the agent 16 generates a corresponding vector for the word frequency list of the title of the candidate document, and then obtains the cosine of the angle between the two vectors, which constitutes the returned value RV1. The agent 16 then derives the value $(1-RV_1)$, multiplies this value by the weight $W_1$, and enters the resulting value, $W_1.(1-RV_1)$, in a Document Returned Value store 23 in the file server 14, in association with the URL of the candidate document.

This first part of the analysis algorithm constitutes a component of the first predetermined function of the present invention, and the word frequency list of the reference document constitutes a component of the first output of the present invention. In this embodiment, the first part of the analysis algorithm also constitutes a component of the second predetermined function of the present invention and the returned value $RV_1$ constitutes a component of the dissimilarity measure (second output) of the present invention.

Referring now to the other metrics, $M_2$ to $M_4$, the returned value $RV_2$ is a measure of the dissimilarity of the character-level n-gram frequency list of the reference document and the character-level n-gram frequency list of the candidate document, and is obtained by the agent 16 under control of a second part of the analysis algorithm applying the metric $M_2$; the returned value $RV_3$ is a measure of the dissimilarity of the word frequency list of the reference document and the word frequency list of the candidate document, and is obtained by the agent 16 under control of a third part of the analysis algorithm applying the metric $M_3$; and the returned value $RV_4$ is a measure of the dissimilarity of the word-level n-grams of the reference document and the word-level n-grams of the candidate document, and is obtained by the agent 16 under control of a fourth part of the analysis algorithm applying the metric $M_4$.

The second, third and fourth parts of the analysis algorithm constitute respective components of the first predetermined function of the present invention, and the character-level n-gram frequency list of the reference document, the word frequency list of the reference document, and the word-level n-gram list of the reference document constitute respective components of the first output of the present invention. In this embodiment, the second, third and fourth parts of the analysis algorithm also constitute respective components of the second predetermined function of the present invention and the returned values $RV_2$, $RV_3$, and $RV_4$ constitute respective components of the dissimilarity measure (second output) of the present invention.

In this first embodiment, "n" is three for word-level n-grams, and five for character-level n-grams; a character-level n-gram frequency list comprises respective sublists for character bigrams, character trigrams, character tetragrams, and character pentagrams; a word-level n-gram frequency list comprises respective sublists for word unigrams (single words), word bigrams and word trigrams, i.e. the term "n-gram frequency list" in this specification in relation to words means $$\sum_{1}^{n} n\text{-}gram, \text{ and in relation to characters means } \sum_{2}^{n} n\text{-}gram.$$

The abovementioned processing of the reference document to derive the weights is performed in accordance with fifth, sixth and seventh parts of the analysis algorithm. The fifth and sixth parts obtain two measurements which are inputs to the seventh part of the analysis algorithm which generates the weights $W_1$ to $W_4$. The first measurement relates to the size of the reference document and the second measurement relates to the amount of linguistic variation.

In the first measurement, the agent 16, in accordance with the fifth part of the analysis algorithm, performs a word count of the text of the reference document.

In the second measurement, which can be thought of as a homogeneity test, the agent 16, under the control of the sixth part of the analysis algorithm, divides the text of the reference document into two substantially equal portions, each sentence being allocated to one or other of the two portions on a random basis (step 36B). For each of the two portions, the agent 16 generates a respective word frequency list, and then compares the lists (step 36C), finding words that are common to both lists and for each such word deriving the modulus of the difference of their respective ranks (R), i.e. performs a simple correlation process upon the lists. As an example, if the word "metric" was ranked sixth ($R_6$) in one list and eighth ($R_8$) in the other list, then the derived value would be two. The sum (H) of these differences is obtained and is an inverse measure of the homogeneity of the reference document. In other words, if the two portions produced identical word frequency lists, then all the respective differences would be zero and the sum would be zero (high homogeneity). In the event that a word in one list is not in the other list, a pseudo rank of "r+1", i.e. ($R_{r+1}$), is given for the missing rank, where "r" is the number of words in the other word list. For the purposes of the present invention, this simple correlation process constitutes a rank-based correlation process.

In a variant, the sixth part of the analysis algorithm produces a value representative of the homogeneity by performing a Log-Likelihood (LL) measure upon the two portions, in a manner similar to step 38C described below in relation to the frequency sublists of the candidate document and the reference document.

The word count (WC) produced by the fifth part of the analysis algorithm and the sum (H) produced by the sixth part of the analysis algorithm are supplied as inputs to the seventh part of the analysis algorithm which produces the weights, $W_1$ to $W_4$ (step 36D) in accordance with a confidence value (CV), where CV=WC/H.

For a particular set of source documents used by the Applicant, the homogeneity values were less than a hundred, and the word counts were greater than a thousand. For these documents, the threshold value chosen for the CV was ten, i.e. a reference document whose confidence value is at least ten is deemed to have high confidence and a reference document whose confidence value is below ten is deemed to have low confidence. For documents of different content and vocabulary size compared with these source documents the homogeneity values and word counts can be markedly different, and a different value for the threshold value will be chosen, as appropriate.

For a high confidence reference document the values $W_1=1$, $W_2=1$, $W_3=1$, and $W_4=1$ are used; and for a low confidence reference document the values $W_1=1$, $W_2=10$, $W_3=1$, and $W_4=0.1$ are used, i.e. in this latter case we reduce the contribution of the metric $M_4$ and put greater emphasis on the contribution of the metric $M_2$ (for the reasons above).

In a variant, CV is not a step function, as above where the weights have a first set of values if CV is at least ten and a second set of values if CV is less than ten, but the weights vary as a continuous function of CV. For a very low value of CV, $W_2$ has a high value, $W_3$ has a medium value, and $W_4$ has a low or zero value. As CV increases, $W_2$ decreases, $W_3$ remains constant (or in another variant, increases to a maximum and then decreases), and $W_4$ increases to an asymptote.

In another variant, the weights are set such that each $W_i \cdot RV_i$ has approximately the same common value.

In yet another variant, the weights have a minimum value below which they cannot be set, either by the seventh part of the analysis algorithm or by the user if he modifies any values, as described later. In this way, a weight can be increased by the agent 16 under control of a tenth part of the analysis algorithm which adjusts the weights depending upon relevance values accorded by the user. This is described in more detail later.

In step 36E, the agent 16, as mentioned earlier, applies the second, third and fourth parts of the analysis algorithm to the reference document, and stores the character-level n-gram frequency list, the word frequency list, and the word-level n-gram frequency list, thus obtained in a store 19 in the file server 14.

In a variant, the third part of the analysis algorithm does not produce the word frequency list of the reference document, but this is generated by the sixth part of the analysis algorithm from the respective word frequency lists for the two portions of the document (from the homogeneity test).

The agent 16 now displays on the user's workstation 10 in respective fields in a search information page, the values of the weights, $W_1$ to $W_4$, and a default value (10,000) for the DT (step 36F), and the user can modify these values by entering values in those fields from his keyboard to overwrite the agent-derived values (step 36G).

When the user is satisfied with the values, he clicks on a Proceed button in the page to continue the search by the agent (step 36H).

The agent now reads its search directives from a task file 21 in the file server 14 (step 38A). These directives cover such details as:

the start URL for the search (i.e. the start document);
the number of levels to search (this is a minimum of one, but is preferably not greater than ten to avoid long search times);
the boundaries of the search (including the condition for terminating the search);
the directories to be excluded.

The agent 16 then proceeds to search for candidate documents in a manner known as breadth-first, exploring links as it finds them.

The user will have specified the start URL with either a ".txt" or a ".html" extension, and the agent 16 will ignore any other extensions when following links in documents.

When the agent 16 locates the start candidate document, it retrieves it by performing a procedure known as an http "get" operation (step 38B) putting the document in a temporary document store 17 to facilitate analysis, and proceeds to apply the first metric, $M_1$. The value of the returned value $RV_1$ is obtained and temporarily stored in an accumulator 25 in the file server 14. Then the value of $W_1 \cdot (1-RV_1)$ is obtained under control of an eighth part of the analysis algorithm and entered in the Document Returned Value store 23. This store is managed under the control of a ninth part of the analysis algorithm to sum the components of the DD.

Next, the agent 16 proceeds to obtain the returned value $RV_2$ by applying the metric $M_2$ to the candidate document, as described below.

Under control of the second part of the analysis algorithm ($M_2$), the agent 16 now derives the character-level n-gram frequency sublists for the candidate document (step 38C). A Log-Likelihood (LL) measure of the dissimilarity between these frequency sublists and those of the reference document is obtained (step 38C) in accordance with the technique described in the article "Accurate methods for the statistics of surprise and coincidence" by E. Dunning, Computational Linguistics, vol 19, number 1, 1993. This measure, which constitutes the returned value $RV_2$, is temporarily stored in the accumulator 25.

The LL (returned value $RV_2$) is now multiplied by the weight $W_2$, under control of the eighth part of the analysis algorithm, and added cumulatively to the contents of the Document Returned Value store 23.

In variants, a rank correlation technique is used instead of LL. In other words, a returned value $RV_2$ is obtained by comparing the first entry of the first sublist (bigram, $R_{1(ref)}$) of the character-level n-gram frequency list of the reference document with the corresponding sublist for the candidate document, and if a match is found, entering the modulus of the difference in ranks ($|R_{1(ref)} - R_{mc(can)}|$) in the accumulator 25, where $R_{mc(can)}$ is the rank (R) of the matching character (mc) in the corresponding sublist for the candidate document (can). As explained above in connection with the homogeneity test, if no match is found, the value $|R_{1(ref)} - R_{r(can)+1}|$ is stored, where $R_{r(can)+1}$ is a pseudo rank one less than the lowest rank of the corresponding candidate sublist.

After storing the rank difference for the first bigram in the accumulator 25, the analysis algorithm then steps to the bigram of second rank, entering the respective rank difference in the accumulator 25, and so on. When all the bigrams have been processed, then the other sublists are processed in sequence. The accumulated sum in the accumulator 25 is the returned value $RV_2$.

Referring back to the specific embodiment, next, the agent applies (step 38C) the metric $M_3$ (the third part of the analysis algorithm) and obtains the LL of the dissimilarity of the word frequency list of the reference document and of the word frequency list of the candidate document. The agent 16 then weights the LL (which constitutes the returned value $RV_3$) by the weight $W_3$, under control of the eighth part of the analysis algorithm, and adds the value $W_3 \cdot RV_3$ cumulatively to the contents of the Document Returned Value store 23.

Next, the agent obtains the returned value $RV_4$ (step 38C) under the control of the fourth part of the analysis algorithm (metric $M_4$) as follows.

The agent 16 constructs a back-off trigram language model (LM) of the reference document from the sublists of the word-level n-grams (the frequency terms) in accordance with the process disclosed in "Estimation of probabilities from sparse data" by S. Katz, IEE Transactions on Acoustics, Speech and Signal Processing, vol ASSP-35, 1987, and stores the LM in the store 19. The agent 16 then uses this trigram LM to calculate the perplexity value (PP), which constitutes the returned value $RV_4$, of the candidate document in accordance with the process disclosed in "Self-organised language modelling for speech recognition" by F. Jellinek, in "Readings in Speech Recognition", edited by A. Waibel and K. Lee, published by Morgan Kaufmann, 1990, and stores the PP in the store 19. The agent 16 then multiplies the PP by the weight $W_4$, under control of the eighth part of the analysis algorithm, and enters it into the Document Returned Value store 23. The lower the PP the better the LM is at predicting the contents of the candidate document, and hence the less dissimilar the candidate document is to the reference document.

It will be understood that in this preferred embodiment the LM is generated from the reference document only at the start of the search, and will not be generated again.

The agent 16 now compares, under the control of an eleventh part of the analysis algorithm, the total value in the Document Returned Value store 23, i.e. the Document Dissimilarity (which has been obtained by summing the components in accordance with the expression of the ninth part of the analysis algorithm) with the Dissimilarity Threshold DT, and, if the Document Dissimilarity is less than the DT, stores the document in the retained text store 18. In any event, the candidate document is deleted from the temporary document store 17 and the accumulator 25 is reset to zero in readiness for processing of the next candidate document, which the agent locates by following a URL link in known manner from the candidate document just processed. The agent follows links which have either a ".txt" or a ".html" extension and ignores links which have any other extension. In a variant, the agent 16 responds to links having extensions other than ".txt" or a ".html" and performs a validation check on these links, but does not attempt to retrieve any files.

The agent 16 aborts any attempt to download an individual page if a predetermined timeout is reached, and then moves on to attempt a download of another page.

When the search has finished, i.e. when all the search directives have been satisfied, the agent 16 sorts (from the data in store 23) the URLs that it has visited in reverse order of Document Dissimilarity, i.e. lowest first, and, in usual manner, presents the first ten document URLs and titles of the sorted list (this list being also referred to as the search results) together with their associated Document Dissimilarities as a first page on the user's workstation 10. The user can retrieve any of the search documents from the retained text file 18 for immediate display by clicking on its displayed document title.

Instead of the reference corpus being a single reference document identified by a user-provided URL, the reference corpus can be a complete WWW (Web) site, also identified by a user-provided URL, and the agent 16 will analyse the contents of the entire Web site, in a similar manner to analysing a single document, to produce corresponding weights $W_1$ to $W_4$, and corresponding frequency lists. In a variant, the user can specify a plurality of individual documents by their URLs, and the agent will treat that plurality of documents as a reference corpus.

The results page includes a relevance icon associated with each document and representing a function for modifying the weights $W_1$ to W4. The user can indicate to the agent 16 the relevance of one or more search documents. By clicking on a selected icon the user is presented with a choice of relevance levels (R) from zero to ten, with the default level being zero. In variants, there are a plurality of relevance icons for a document enabling direct selection of the corresponding relevance level, or the user can set a relevance value using a slider bar (i.e. a continuously variable relevance function), in known manner.

The user may stop the search after a short time and check the search results. If there are too many documents found by the agent 16, the user can reduce the value for DT to, say, 6000, and trigger the agent for a new search.

If the user desires to refine the search, he can indicate the relevance of one or more of the search documents and click on a Refine Search button.

Starting with the top ranking search document, i.e. the document having the lowest DD, the agent 16 now produces modified weights $(W_1+\Delta W_1)$ to $(W_4+\Delta W_4)$ under the control of the tenth part of the analysis algorithm, which generates $\Delta W$ as follows:

$$\Delta W_i = (k).(W_i.RV_i/DD).(R-5).W_i$$

where k is a constant having a value of 1/50 for this embodiment, whereby the maximum value of $\Delta W_i$ is approximately $1/10\ W_i$. In other words, a weight is modified by multiplying it by (1+K), where $K=(k).(W_i.RV_i/DD).(R-5)$.

The agent 16 now moves to the second highest ranking search result and again modifies the weights, and so on, i.e. iteratively, down through the list of search results.

In this embodiment the agent 16 proceeds with a new search when it has performed its last weight modification without changing the reference corpus. In variants the reference corpus is combined with at least the search document having the highest allocated relevance level.

In alternative forms of this embodiment the agent 16 first combines the reference corpus with at least the search document having the highest allocated relevance level, and repeats the fifth, sixth and seventh parts of the algorithm to generate a new set of weights, instead of modifying the original set of weights.

In a variant, the agent 16 ignores any search document for which the user has allocated zero relevance, i.e. the user has left the relevance level at its default level.

In one variant the application of zero relevance by default is not used and the user has to indicate the relevance of all search documents before the refined search can proceed.

In the second embodiment of the present invention, the agent 16 is adapted for use in a speech recognition system to provide an LM. In this exemplary embodiment the LM relates to a target domain constituted by a rail timetable information system and is representative of how language is used in that particular domain. Speech received from a user of the information system is compared with the LM which is in the form of a back-off trigram language model, in order that the speech recognition system can anticipate with a high degree of confidence the next word to be received.

A convenient starting point is transcriptions of a plurality of spoken transactions in the target domain. These are provided by a developer of the speech recognition system as a reference corpus for the agent 16 by recording and transcribing actual user interactions in the target domain.

The agent 16 first divides the reference corpus into two portions, these being referred to as a training portion and a development portion (in this context, a portion of the reference corpus is also known as a subcorpus). If the reference corpus is reasonably large, then the training portion is approximately 50% of the reference document, but for a small reference corpus the training portion will be approximately 80%.

Then the agent 16 performs an initial analysis on the training portion, producing weights $W_1$ to $W_4$ for metrics $M_1$ to $M_4$, in a like manner to the first embodiment, and a default DT, as before, and constructs an LM in the form of a back-off trigram language model (metric $M_4$). The weights $W_1$ to $W_4$ are displayed via a page on a system developer's workstation 10 for acceptance or modification by the system developer.

The agent 16 now applies the LM to the development portion and obtains the PP of the development portion, referred to as $PP_{old}$.

The system developer now directs the agent 16 to a list of relevant WWW servers. In a variant, the agent 16 is directed to a database of potentially useful documents on a local computer.

The agent 16 retrieves a first candidate document, applies the metrics $M_1$ to $M_4$ with weights $W_1$ to $W_4$, as in the first embodiment, stores that candidate document if it has a DD less than the DT, and proceeds to retrieve further documents.

The agent 16 takes from the retained text file 18 the candidate document having the lowest DD value, and, in accordance with a ninth part of the analysis algorithm, temporarily combines this document with the training portion of the reference corpus, obtains a new LM and applies this new LM to the development portion to obtain a new PP, referred to as $PP_{new}$.

In a similar manner to the first embodiment, the agent 16 now produces modified weights in accordance with the expression $$\Delta W_i = (k).(W_i.RV_i/DD).(PP_{old} - PP_{new}).W_i$$

where k is a constant having a value of 1/2000 for this embodiment, whereby the maximum value of $\Delta W_i$ is approximately $1/10\ W_i$.

The agent 16 repeats the process of the ninth part of the analysis algorithm for the document in the retained text file 18 having the next lowest DD value, and iteratively further modifies the weights. The modification of the weights stops when the agent 16 has performed a modification in respect of the last document in the retained text file 18. The agent 16 now proceeds to retrieve more documents, processing them in using the current set of weights.

In variants, the agent 16 performs processing in accordance with the ninth part of the analysis algorithm on a document by document basis, i.e. retrieve documents until a first document is found having a DD less than the DT, modify the weights on the basis of this first found document, then retrieve again, find a second document and modify on the basis of this second found document, and so on.

In variants, the documents retrieved from the retained text file 18 in this ninth part of the analysis algorithm are combined permanently with the training portion, which consequently becomes progressively larger.

The prior-mentioned article by Katz describes use of an LM in a speech recognition context. This use, per se, is not part of the present invention, and will not be described further.

In variants of this speech recognition system, the LM relates to other target domains. The LM can be used in other speech-related applications, for example word spotting Whereas in the above embodiments the four metrics are used together, the present invention extends to embodiments in which only one of the four metrics is used, and to embodiments in which any two or any three of the four metrics are used in combination. In general, the more metrics there are in combination the better the performance of the agent 16.

The homogeneity test of the sixth part of the analysis algorithm can be used, in accordance with another aspect of the invention, to test the suitability of a reference document for use as a reference corpus, or part thereof.

What is claimed is:

1. A method of information retrieval comprising:

(a) receiving from a user, data identifying a stored reference corpus;

(b) retrieving the identified reference corpus from storage;

(c) generating initial values of respective weights corresponding to a plurality of analysis algorithms by processing the retrieved reference corpus in accordance with a predetermined algorithm;

(d) retrieving from storage another text document as a candidate document;

(e) performing respective comparisons between the candidate document and the reference corpus in accordance with each of said analysis algorithms and producing respective comparison results;

(f) generating corresponding weighted comparison results by multiplying each said comparison result by its respective weight;

(g) summing the weighted comparison results to produce a dissimilarity measure that is indicative of the degree of dissimilarity between the retrieved reference corpus and the retrieved candidate document; and (h) storing the candidate document in a retained text store if said sum is indicative of a degree of dissimilarity less than a predetermined degree of dissimilarity.

2. A method as in claim 1 wherein:

a first of said analysis algorithms is arranged to generate and compare word frequency lists and to produce a comparison result; and said predetermined algorithm includes forming from the reference corpus separate first and second parts, performing a comparison between said first and second parts in accordance with said first analysis algorithm, the resulting comparison result constituting a measure of the homogeneity of said first and second parts.

3. A method as in claim 2 wherein:

a second of said analysis algorithms is arranged to generate and compare word-level n-gram frequency lists and to produce a comparison result; and said predetermined algorithm includes calculating a confidence value by multiplying the said measure of the homogeneity by the total number of words of the word frequency lists generated for obtaining said measure of homogeneity, and, if this confidence value is less than a predetermined threshold, setting to substantially zero the value of the weight corresponding to said second analysis algorithm.

4. A method as in claim 1, including the steps of:

presenting to the user, for each of a plurality of candidate documents stored in the retained text store, the respective dissimilarity measures and respective links to said plurality of stored retrieved texts, receiving from the user an allocated relevance value R in respect of a presented dissimilarity measure, and modifying said weights by multiplying each weight (Wi) by a respective weight factor (1+ki), where ki is a function of the contribution that the respective weighted comparison result makes to the dissimilarity measure, and the value of R−Rmean, where Rmean is the mean of lowest and highest possible relevance values.

5. A method as in claim 2, including the steps of:

presenting to the user, for each of a plurality of candidate documents stored in the retained text store, the respective dissimilarity measures and respective links to said plurality of stored retrieved texts, receiving from the user an allocated relevance value R in respect of a presented dissimilarity measure, and modifying said weights by multiplying each weight (Wi) by a respective weight factor (1+ki), where ki is a function of the contribution that the respective weighted comparison result makes to the dissimilarity measure, and the value of R−Rmean, where Rmean is the mean of lowest and highest possible relevance values.

6. A method as in claim 3, including the steps of:

presenting to the user, for each of a plurality of candidate documents stored in the retained text store, the respective dissimilarity measures and respective links to said plurality of stored retrieved tests, receiving from the user an allocated relevance value R in respect of a presented dissimilarity measure, and modifying said weights by multiplying each weight (Wi) by a respective weight factor (1+ki), where ki is a function of the contribution that the respective weighted comparison result makes to the dissimilarity measure, and the value of R−Rmean, where Rmean is the mean of lowest and highest possible relevance values.

7. A method of generating a language model, said method comprising:

(i) providing a reference corpus;

(ii) forming from said reference corpus a training portion and a development portion;

(iii) generating initial values of respective weights corresponding to a plurality of analysis algorithms by processing the training portion in accordance with a predetermined algorithm;

(iv) performing a comparison between the training portion and the development portion in accordance with a first of said analysis algorithms and producing an initial comparison result, said first analysis algorithm being arranged to generate and compare word-level n-gram frequency lists having n-grams from unigrams up to m-grams, where m is a predetermined integer, the word-level n-gram frequency list generated from the training portion constituting a language model;

(v) performing information retrieval in accordance with steps (d) to (h) of the method of claim 1, using the above mentioned plurality of analysis algorithms, and using the training portion as the reference corpus;

(vi) retrieving a document from the retained text store;

(vii) modifying the training portion by combining it with the document retrieved from the retained text store;

(viii) repeating step (iv) in respect of the modified training portion to produce a further comparison result; and (ix) modifying the weights in accordance with a weight modifying function of said initial and further comparison results.

8. A method as in claim 7 wherein step (v) is stopped when a first candidate document is stored in the retained text store.

9. A method as in claim 7 wherein step (vi) comprises selecting the document for retrieval on the basis of the least degree of dissimilarity.

10. A method as in claim 9 wherein steps (vi) to (ix) are iteratively performed in respect of respective documents successively selected by increasing degree of dissimilarity.

11. A method as in claim 10 wherein the modified training portion produced by step (vii) of one iteration of steps (vi) to (ix) constitutes the training portion of step (vii) of the next iteration thereof.

12. A method as in claim 7, wherein the weight modifying function comprises multiplying each weight (Wi) by a respective weight factor (1+ki), where ki is a function of the contribution that the respective weighted comparison result makes to the dissimilarity measure, and the difference between the initial comparison result and the further comparison result.

13. A method as in claim 8, wherein the weight modifying function comprises multiplying each weight (Wi) by a respective weight factor (1+ki), where ki is a function of the contribution that the respective weighted comparison result makes to the dissimilarity measure, and the difference between the initial comparison result and the further comparison result.

14. A method as in claim 9, wherein the weight modifying function comprises multiplying each weight (Wi) by a respective weight factor (1+ki), where ki is a function of the contribution that the respective weighted comparison result makes to the dissimilarity measure, and the difference between the initial comparison result and the further comparison result.

15. A method as in claim 10, wherein the weight modifying function comprises multiplying each weight (Wi) by a respective weight factor (1+ki), where ki is a function of the contribution that the respective weighted comparison result makes to the dissimilarity measure, and the difference between the initial comparison result and the further comparison result.

16. A method as in claim 11, wherein the weight modifying function comprises multiplying each weight (Wi) by a respective weight factor (1+ki), where ki is a function of the contribution that the respective weighted comparison result makes to the dissimilarity measure, and the difference between the initial comparison result and the further comparison result.

17. An information agent for use in a communications network including a plurality of databases, the agent comprising;

means for generating initial values of respective weights corresponding to a plurality of analysis algorithms by processing an identified reference corpus in accordance with a predetermined algorithm;

means for retrieving from storage a text document as a candidate document;

means for performing respective comparisons between the candidate document and the reference corpus in accordance with each of said analysis algorithms and producing respective comparison results;

means for generating corresponding weighted comparison results by multiplying each said comparison result by its respective weight;

means for summing the weighted comparison results to produce a dissimilarity measure that is indicative of the degree of dissimilarity between the retrieved reference corpus and the retrieved candidate document, and means for storing the candidate document in a retained text store if said sum is indicative of a degree of dissimilarity less than a predetermined degree of dissimilarity.

18. A document access system, for accessing documents stored in a distributed manner and accessible by means of a communications network, the access system comprising at least one software agent for use in accessing documents by means of the network, wherein the agent comprises:

means for generating initial values of the respective weights corresponding to a plurality of analysis algorithms by processing an identified reference corpus in accordance with a predetermined algorithm;

means for retrieving from storage a text document as a candidate document;

means for performing respective comparisons between the candidate document and the reference corpus in accordance with each of said analysis algorithms and producing respective comparison results;

means for generating corresponding weighted comparison results by multiplying each said comparison result by its respective weight;

means for summing the weighted comparison results to produce a dissimilarity measure that is indicative of the degree of dissimilarity between the retrieved reference corpus and the retrieved candidate document; and means for storing the candidate document in a retained text store if said sum is indicative of a degree of dissimilarity less than a predetermined degree of dissimilarity.

* * * * *